(12) United States Patent
Harrison

(10) Patent No.: US 9,836,988 B2
(45) Date of Patent: Dec. 5, 2017

(54) EMERGENCY MEDICAL SERVICES AND PARAMEDIC SIMULATION AND TRAINING APPARATUS IN A TRANSFERABLE ENVIRONMENT

(71) Applicant: Robert R. Harrison, Coleman, TX (US)

(72) Inventor: Robert R. Harrison, Coleman, TX (US)

( * ) Notice: Subject to any disclaimer, the term of this patent is extended or adjusted under 35 U.S.C. 154(b) by 154 days.

(21) Appl. No.: 14/735,852

(22) Filed: Jun. 10, 2015

(65) Prior Publication Data
US 2016/0365005 A1 Dec. 15, 2016

(51) Int. Cl.
*G09B 9/04* (2006.01)
*G09B 9/00* (2006.01)
(Continued)

(52) U.S. Cl.
CPC ............... *G09B 9/00* (2013.01); *G09B 5/00* (2013.01); *G09B 9/02* (2013.01); *G09B 9/04* (2013.01); *G09B 23/28* (2013.01)

(58) Field of Classification Search
CPC . G09B 9/02; G09B 9/04; G09B 9/042; G09B 9/048; G09B 9/05; G09B 9/06;
(Continued)

(56) References Cited

U.S. PATENT DOCUMENTS 2,564,691 A 8/1951 Heiles
4,777,675 A 10/1988 Letner
(Continued)

FOREIGN PATENT DOCUMENTS

EP 0146465 A2 6/1985
EP 1934848 A2 6/2008
(Continued)

OTHER PUBLICATIONS

Heaton, Brian, "HighTech Ambulance Simulator Debuts in Oregon," Emergency Management, http://www.emergencymgmt.com/training/HighTechAmbulanceSimulatorOregon.html, Mar. 21, 2012.

(Continued)

*Primary Examiner* — Robert J Utama
*Assistant Examiner* — Lily M Del Valle
(74) *Attorney, Agent, or Firm* — Schultz & Associates, P.C.

(57) ABSTRACT

A remotely actuated emergency medical services training apparatus designed to simulate a moving ambulance. The apparatus is comprised of a mock up of the rear of an ambulance positioned on a set of suspension parts controlled by a computer. A lower base and an upper base are connected via a set of air springs, shock absorbers, and sway braces. The upper base is connected to the mock up of the ambulance. Air springs which move the upper base relative to the lower base are controlled by a set of programmed instructions resident on the computer or manually by a joystick controller connected to the computer. Each component of the apparatus is sized to be easily transported through typically dimensioned doorways and hallways such that assembly and disassembly within the confines of a typical classroom is possible.

23 Claims, 15 Drawing Sheets

(51) Int. Cl.
*G09B 23/28* (2006.01)
*G09B 5/00* (2006.01)
*G09B 9/02* (2006.01)

(58) Field of Classification Search
CPC ... G09B 9/08; G09B 9/10; G09B 9/12; G09B 9/165; G09B 9/203; G09B 9/206; G09B 9/28; G09B 9/30; G09B 9/42; G09B 9/44; G09B 9/46; G09B 9/48; G09B 9/50; G09B 9/52
See application file for complete search history.

(56) References Cited

U.S. PATENT DOCUMENTS

| | | | | |
|---|---|---|---|---|
| 5,388,991 | A * | 2/1995 | Morris | A63G 31/16 434/34 |
| 5,605,462 | A * | 2/1997 | Denne | F15B 15/00 434/372 |
| 6,598,363 | B1 | 7/2003 | Ferguson et al. | |
| 6,739,877 | B2 | 5/2004 | Bailey et al. | |
| 7,347,472 | B2 | 3/2008 | Pellegrin, Jr. | |
| 8,458,962 | B2 | 6/2013 | Gallant et al. | |
| 8,479,464 | B2 | 7/2013 | Holzworth | |
| 8,677,698 | B2 * | 3/2014 | Segall | E04B 1/34315 52/127.11 |
| 8,888,495 | B2 * | 11/2014 | Johnson | G09B 5/06 434/219 |
| 9,430,953 | B2 * | 8/2016 | Morris | G09B 9/04 |
| 2002/0115043 | A1 * | 8/2002 | Baker | G09B 19/16 434/30 |
| 2004/0054760 | A1 | 3/2004 | Ewing et al. | |
| 2005/0048446 | A1 * | 3/2005 | Fromyer | A63G 31/12 434/29 |
| 2007/0059668 | A1 * | 3/2007 | Mallaci | G09B 9/00 434/29 |
| 2009/0149111 | A1 | 6/2009 | Scherba | |
| 2009/0188188 | A1 | 7/2009 | Rivet | |
| 2012/0288837 | A1 | 11/2012 | Eikefjord | |
| 2013/0000218 | A1 * | 1/2013 | Uffner | E04B 1/34321 52/79.1 |
| 2014/0265283 | A1 * | 9/2014 | Clifton | G09B 9/04 280/755 |
| 2014/0272831 | A1 * | 9/2014 | Sweet | G09B 9/00 434/219 |
| 2015/0024362 | A1 | 1/2015 | Feins et al. | |

FOREIGN PATENT DOCUMENTS

| | | |
|---|---|---|
| GB | 2281269 A | 3/1995 |
| WO | 2006016832 A1 | 2/2006 |
| WO | 2008067295 A2 | 6/2008 |
| WO | 2013000019 A1 | 1/2013 |

OTHER PUBLICATIONS

"Ambulance Simulator Offers RealWorld Training," South Piedmont Community College, http://www.spcc.edu/1125ambulancesimulatoroffersrealworldtraining.html, Nov. 2, 2011.

* cited by examiner

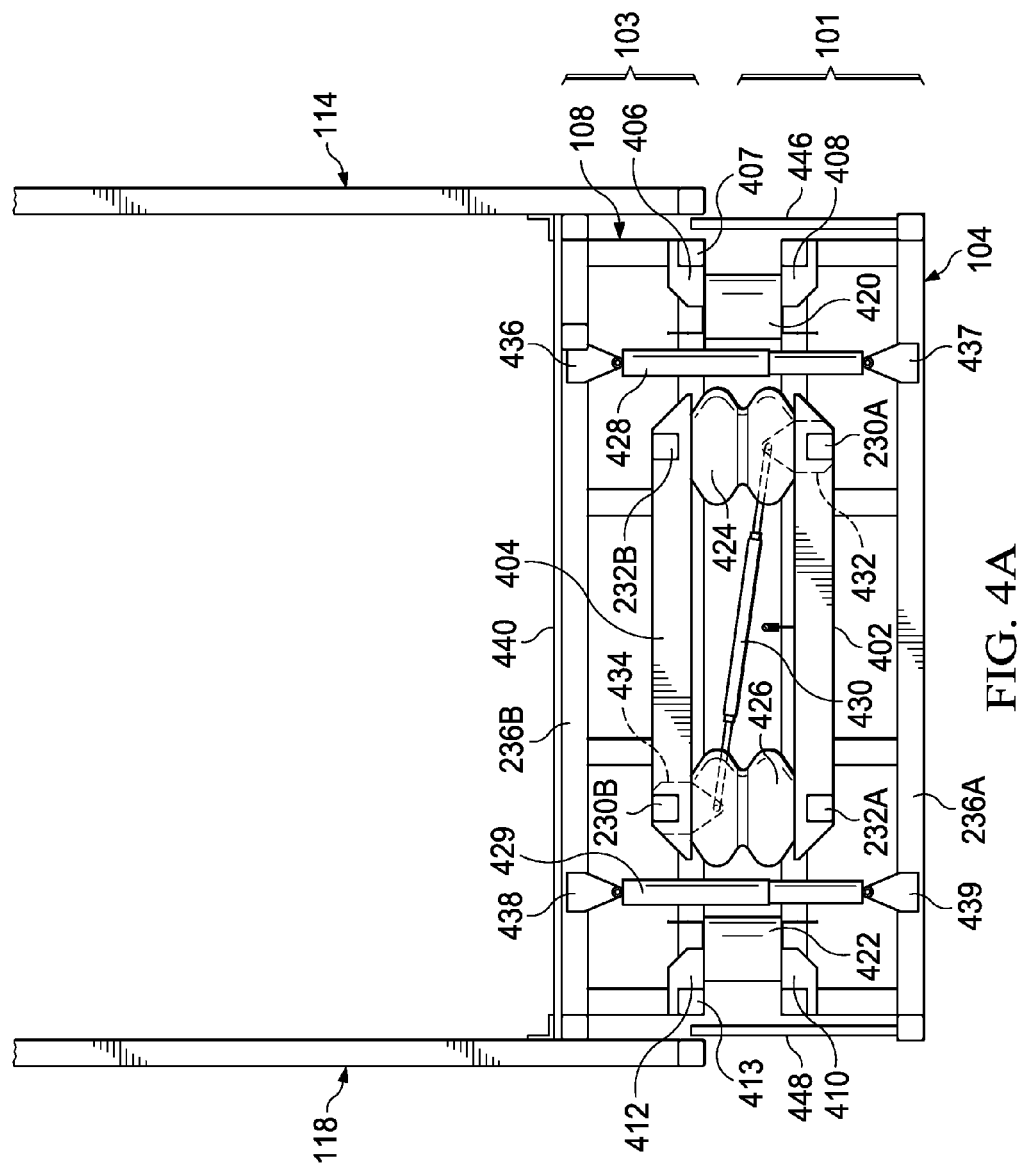

EMERGENCY MEDICAL SERVICES AND PARAMEDIC SIMULATION AND TRAINING APPARATUS IN A TRANSFERABLE ENVIRONMENT

FIELD OF THE DISCLOSURE

The present disclosure relates to medical training equipment. In particular, the disclosure relates to an emergency medical services training devices designed to simulate a moving ambulance.

BACKGROUND OF THE DISCLOSURE

Emergency medical treatment is often provided at the location of illness or injury. Medical treatment is often continued en-route to a hospital while in an ambulance. Medical treatment in a mobile environment is often difficult because of road conditions and traffic.

The rigors of a mobile medical environment require that professionals involved be adequately trained. Exposure to simulated ambulance movements in a practice environment is helpful to train medical professionals to perform in a mobile environment. To this end, the prior art includes various training devices which simulate an ambulance environment.

For example, U.S. Pat. No. 8,888,495 to Johnson, et al. discloses a mobile medical simulation platform for training medical emergency personnel at remote locations in a realistic environment. The platform comprises a mobile base movable between remote geographical locations, a main enclosure defining an interior space separated into an ambulance simulation area and an emergency room simulation area, medical equipment usable in medical simulation training for treating a human patient, and patient simulators configured to provide simulation of medical events and conditions of a human patient. Use of the platform may include conducting training at a first location, moving the platform to a second location, and conducting training at the second location. The platform is an actual road-going vehicle incapable of easy disassembly and reassembly within the confines of a classroom.

South Piedmont Community College discloses an ambulance simulator installed in a classroom. The simulator comprises the actual back end of an ambulance stripped apart and rebuilt in the classroom. A looping video, including a siren, is played on a screen where the cab of the ambulance normally would be to give the impression the ambulance is driving down the road. The simulator is a permanent fixture within the classroom and is not designed to be transferable to other classrooms.

Despite the advantages of the prior art, a major drawback has been that the ambulance simulators disclosed are not easily installed or moved. They are heavy, bulky, and time consuming to install and move.

The prior art fails to disclose or suggest an emergency medical services training apparatus that is easily disassembled and transported and which is designed to simulate a moving ambulance. Therefore, there is a need for an emergency medical personnel training simulator installed in a typical, indoor classroom environment where the practice setting can be easily disassembled to other classrooms.

SUMMARY OF THE DISCLOSURE

In a preferred embodiment, a transferable emergency medical services training apparatus is generally rectangular and is comprised of an upper base subassembly, a lower base subassembly, and an enclosure subassembly covered by opaque siding. The enclosure subassembly is connected to the upper base subassembly. The upper base subassembly is comprised of two base modules and the lower base subassembly is comprised of two base modules. The enclosure subassembly is comprised of four wall panels, a front panel, and a rear panel covered by a roof panel. A finished floor is connected to flanges in the wall panels, rear panel, and front panel. Attached to the upper base subassembly below the rear panel is a bumper. The rear panel includes an opening for two rear doors to simulate an actual rear end of an ambulance. A side door and a window are included in two of the wall panels as well per the specifications of modern ambulances. The inside of the enclosure subassembly is finished to resemble the inside of an ambulance complete with drawers, shelves, doors, tables, etc. A system of audio/video enabled cameras mounted to the interior of the enclosure subassembly allows trainers to observe the trainees inside during a training session.

In a preferred embodiment, the subassemblies are assembled and supported by an active. The active suspension includes a large air spring, a small air spring, and a shock absorber. In the preferred embodiment, the apparatus includes four sets of suspension parts positioned in between and are connected to the upper and lower base subassemblies. The sets of suspension parts are positioned proximate the corners of the upper and lower base subassemblies. In alternate embodiments, fewer or more sets of suspension parts including different uses of air springs and shock absorbers are envisioned. All the air springs are connected to and supplied by a solitary air compressor. The compressor is connected to four air storage tanks positioned near the corners of the lower base subassembly. Each of the four storage tanks is connected to a large air spring and small air spring combination via a pressure sensor. In the preferred embodiment, the apparatus includes one compressor connected to four storage connected to four sets of air springs.

A computer system controls the movement of the apparatus. A set of joystick controllers and the air springs are connected to the computer. An operator, using the joystick controllers, manipulates the movement of the upper base subassembly relative to the lower base subassembly through actuation of the air springs.

In an alternate embodiment, the computer stores a programmed set of instructions which control the actions to simulate various routes and ambulance motions, such as parking, high acceleration, high braking forces and accidents.

In an alternate embodiment, the computer stores a programmed set of instructions which control speakers and other audio/visual display panels in the apparatus in order to simulate instructions from a driver or doctor and to simulate various traffic conditions and patient conditions.

BRIEF DESCRIPTION OF THE DRAWINGS

The disclosed embodiments will be described with reference to the accompanying drawings. Like pieces in different drawings are referenced by the same number.

FIG. 4A is a partial section side view of an upper and lower base subassembly of a preferred embodiment.

DETAILED DESCRIPTION

Figure 1A:
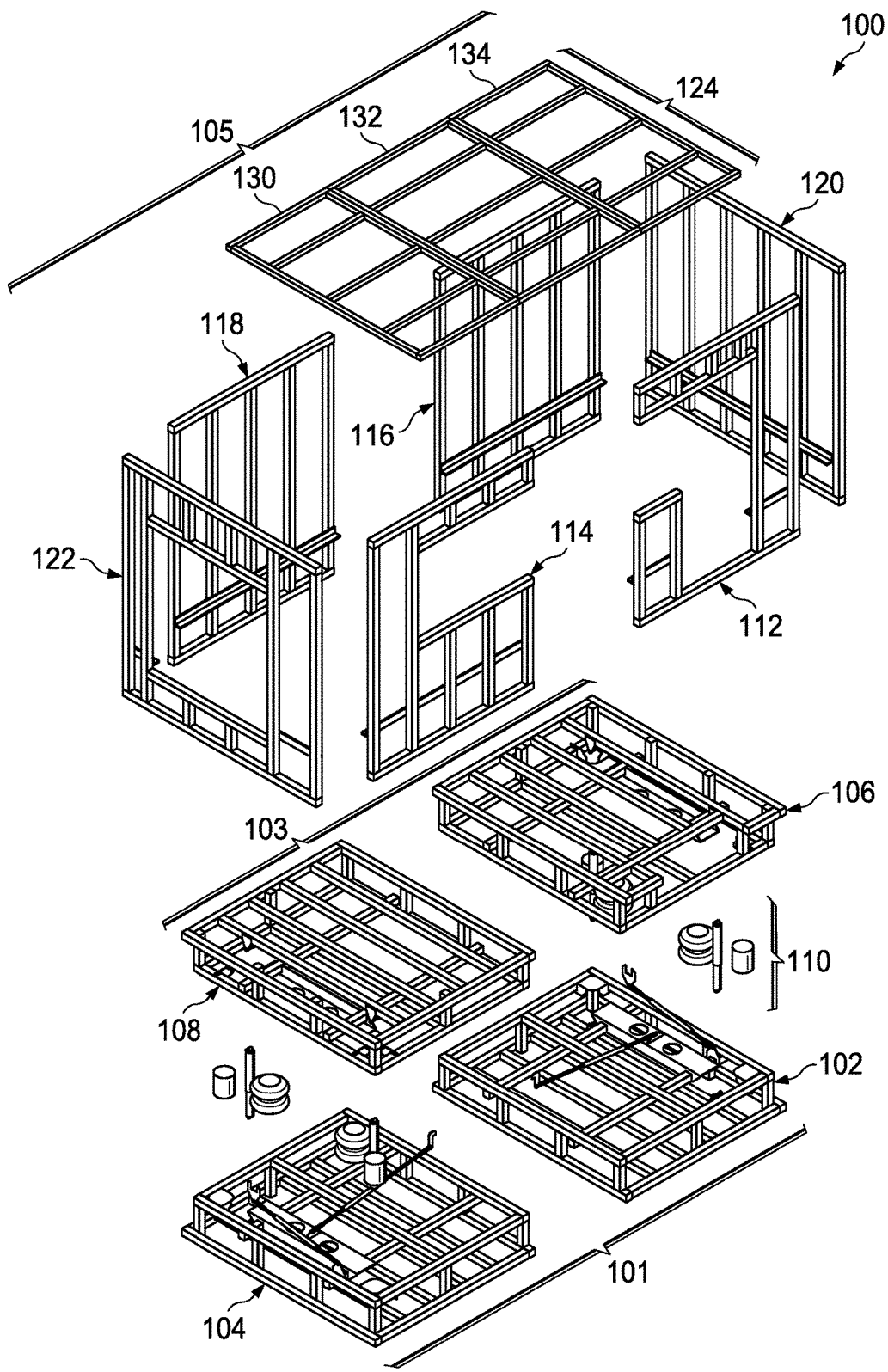
FIG. 1A is an exploded isometric view of a preferred embodiment of the subassemblies.

Referring to FIG. 1A, emergency medical services training apparatus 100 comprises lower base subassembly 101 dynamically connected to upper base subassembly 103 and upper base subassembly 103 connected to enclosure subassembly 105.

Lower base subassembly 101 comprises base module 102 rigidly connected to base module 104. Upper base subassembly 103 comprises base module 106 rigidly connected to base module 108. A set of suspension parts 110 comprising a large air spring, a small air spring, and a shock absorber connect lower base subassembly 101 to upper base subassembly 103. In a preferred embodiment, four sets of suspension parts positioned near the corners of the base subassemblies are employed to connect lower base subassembly 101 to upper base subassembly 103. In alternate embodiments, different combinations of air springs and shock absorbers and fewer or more sets of suspension parts are possible.

Enclosure subassembly forms a generally rectangular shape, dimensioned according to the rear section of a typical ambulance. The inside of the enclosure subassembly is finished to resemble the inside of an ambulance complete with drawers, shelves, tables, stretchers, and medical equipment typically found in an ambulance and used in the training of medical emergency personnel. The inside of the enclosure subassembly also suspends audio and video equipment to monitor the students and to further provide lifelike sounds and images during training, as will be further described. Enclosure subassembly 105 comprises wall panel 112 connected to wall panel 114. Wall panel 114 is connected to rear panel 122. Rear panel 122 is connected to wall panel 118. Wall panel 118 is connected to wall panel 116. Wall panel 116 is connected to front panel 120. Front panel 120 is connected to wall panel 112. Enclosure subassembly further comprises roof assembly 124. Roof assembly 124 comprises three adjacent roof panels 130, 132, and 134. Roof panel 130 is connected to wall panel 114, rear panel 122, and wall panel 118. Roof panel 132 is connected to wall panel 114, wall panel 118, wall panel 112, and wall panel 116. Roof panel 134 is connected to wall panel 112, front panel 120, and wall panel 116.

In a preferred embodiment, subassemblies are attached with nylon shear pins of ⅜ inch diameter. In another alternate embodiment aluminum shear bolts may be employed. In each case, the shear bolts include a reduced diameter neck which allows the subassemblies and panels to be quickly disassembled by hand without the need of tools. During disassembly, the shear bolts are broken as opposed to being untightened, thereby saving time.

In a preferred embodiment, the lower and upper base subassemblies and the enclosure subassembly are comprised of two inch square steel aluminum or titanium channel. In an alternate embodiment, the subassemblies can be comprised of two inch PVC channel. Still in another embodiment, the subassemblies are comprised of two inch PVC pipe, including suitable pipe joints.

Figure 1B:
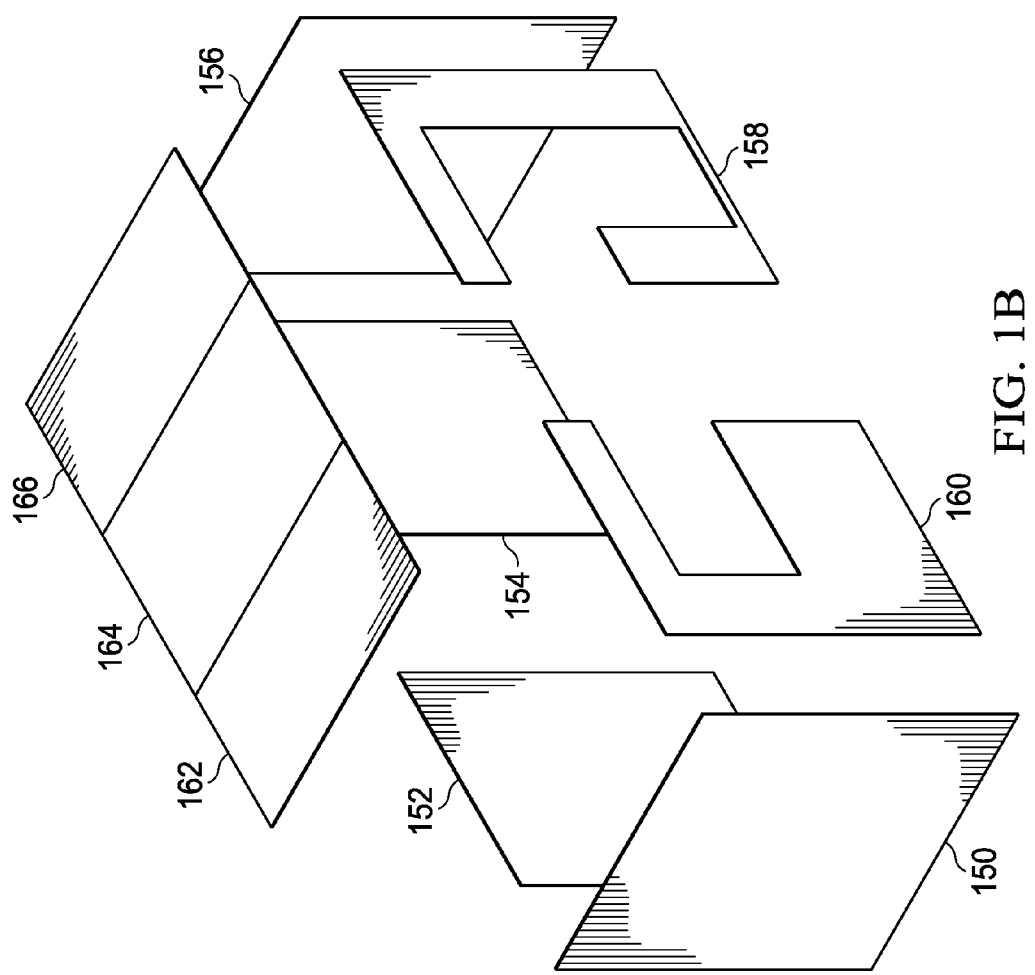
FIG. 1B is an expanded isometric view of the panel cover of a preferred embodiment.

Referring to FIG. 1B, the panel coverings will be described. The panel covering 150 is attached to the exterior of rear panel 122 (shown in FIG. 1). Panel covering 152 is attached to wall panel 118. The panel covering 154 is attached to the outside of wall panel 116. The panel covering 156 is attached to front panel 120. The panel covering 158 is attached to wall panel 112. The panel covering 160 is attached to wall panel 114.

The panel covering 162 is attached to roof panel 130. The panel covering 164 is attached to roof panel 132. The panel covering 166 is attached to roof panel 134.

In a preferred embodiment, the panel coverings are attached to the wall panels connecting with disposable nylon connectors through holes located in the panel coverings and the wall panels. In a preferred embodiment, the disposable nylon connections are closed nylon grommet nuts, ⅜ inches in diameter available from Apex Fasteners of Monrovia, Calif.

In a preferred embodiment, the panel angles can be painted to resemble typical ambulance markings and issue emergency lights and sirens. In an alternate embodiment, the subassemblies and panels can be comprised of fiberglass. In an alternate embodiment, plastic "wraps" can be applied to the panels after painting to indicate different locations of the transportable simulator.

Of significant importance is that each component of emergency medical services training apparatus 100 including base modules 102, 104, 106, and 108; wall panels 112, 114, 116, and 118; front panel 120; rear panel 122; and roof panels 130, 132, and 134 be of limited size. In one preferred embodiment, each component is limited in size to fit through a typical commercial entry door. In one example, a standard commercial door has dimensions of seven feet by three feet. In this embodiment, each component has no depth dimension greater than approximately one foot. In another embodiment, the width of each component is limited to three feet. The limit on the dimensions of each component is to ensure that the components of apparatus 100 all easily fit through a typical commercial entry door. The relatively small size of the components ensures that they can be carried and assembled by a two-man team. The relatively small size also ensures that the components will fit in and can be lifted by a standard building elevator without the need to enlist a cargo elevator or crane. The size limitation of the components is also a key factor in the portability of the apparatus 100. Emergency medical services training apparatus 100 can be easily assembled where needed without having to remove walls or widen doors in order to get the components to the desired locale. Emergency medical services training apparatus 100 can be easily disassembled and transferred to another location as well.

Figure 2:
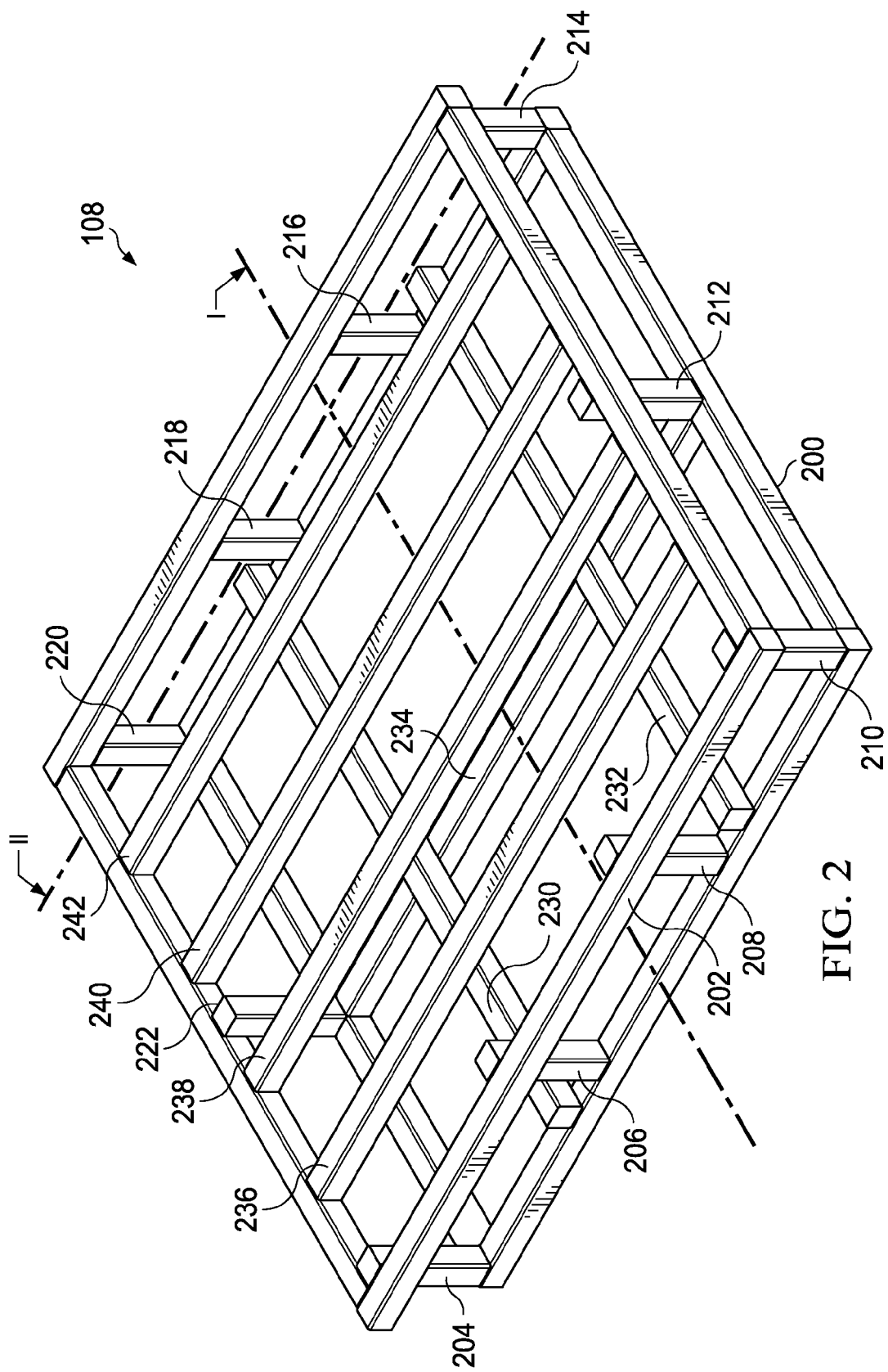
FIG. 2 is an isometric view of a base module of a preferred embodiment.

Referring to FIG. 2. base module 108 is shown. Base module 108 comprises layer 200 connected to and separated from layer 202 by a plurality of standoffs. Standoffs 204, 206, 208, 210, 212, 214, 216, 218, 220, and 222 are all connected to layer 200 and layer 202. Layer 200 comprises a generally rectangular shaped perimeter surrounding longitudinal cross braces 230 and 232 and lateral cross brace 234. Longitudinal cross braces 230 and 232 are generally parallel with each other and perpendicular to lateral cross brace 234. Layer 202 comprises generally a rectangular shaped perimeter surrounding a plurality of evenly spaced lateral cross braces 236, 238, 240, and 242. Lateral cross braces 236, 238, 240, and 242 are generally parallel with each other.

Base module 104 is structurally identical to base module 108 and is oriented as a mirror image of base module 108 about axis I. Base module 102 is structurally identical to base module 108 and is oriented as a mirror image of base module 108 about axis II. In the figures that follow, like parts of each base module are marked with the same numerals plus appended with an "A" for the parts of base module 104 and a "B" for the parts of base module 108.

Figure 3:
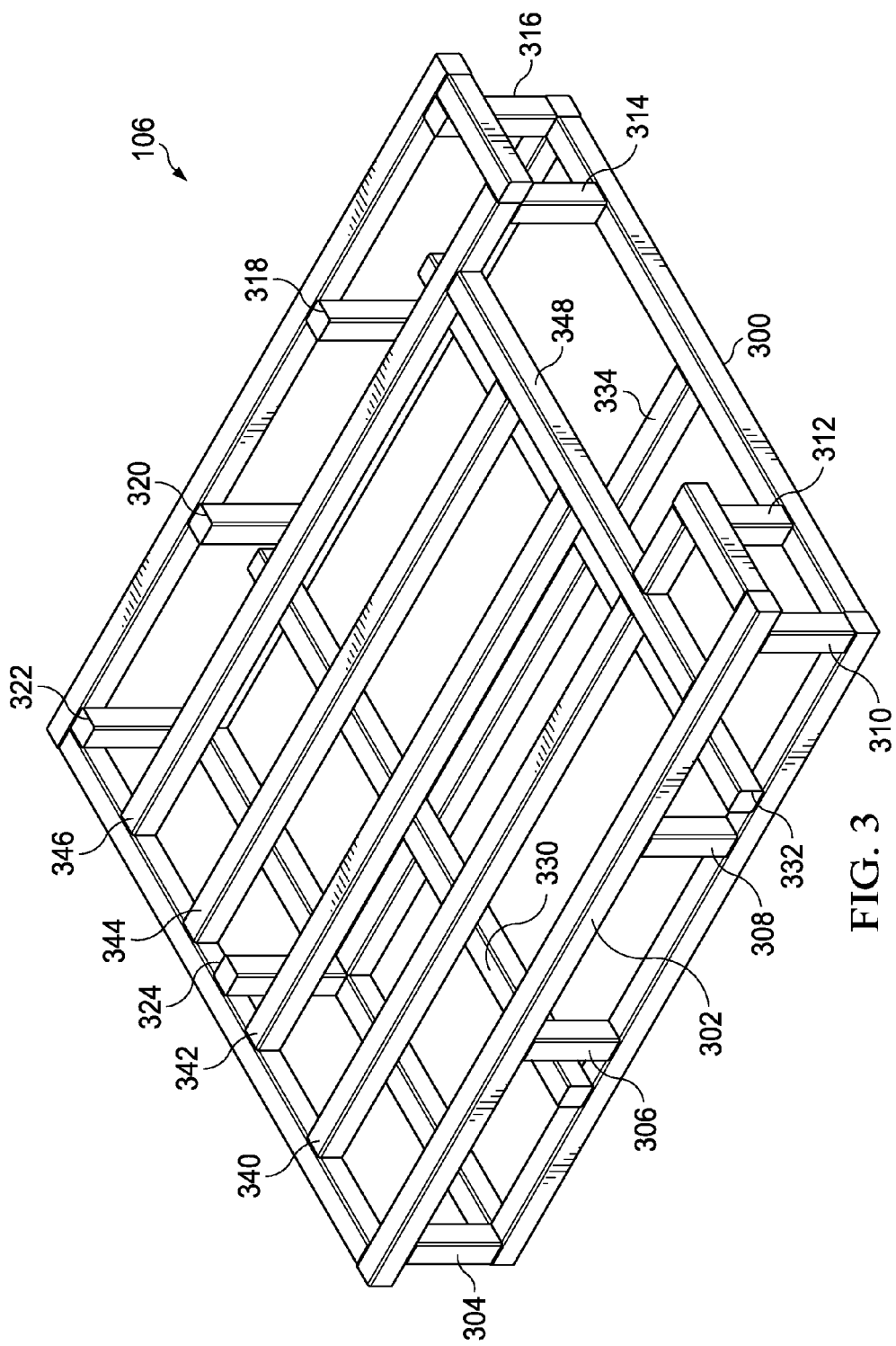
FIG. 3 is an isometric view of a base module of a preferred embodiment.

Referring to FIG. 3, base module 106 is shown. Base module 106 comprises layer 300 connected to and separated from layer 302 by a plurality of standoffs. Standoffs 304, 306, 308, 310, 312, 314, 316, 318, 320, 322, and 324 are all connected to layer 300 and layer 302. Layer 300 comprises a generally rectangular shaped perimeter surrounding longitudinal cross braces 330 and 332 and lateral cross brace 334. Longitudinal cross braces 330 and 332 are generally parallel with each other and perpendicular to lateral cross brace 334. Layer 202 comprises generally a rectangular shaped perimeter surrounding a plurality of evenly spaced lateral cross braces 340, 342, 344, and 346. Lateral cross braces 340, 342, 344, and 346 are generally parallel with each other. Layer 202 further comprises longitudinal cross brace 348. Longitudinal cross brace 348 is set a distance inside the perimeter of layer 302 and provides structure for a step into emergency medical services training apparatus 100.

Referring to FIG. 4A, lower base subassembly 101 is shown connected to upper base subassembly 103 with suspension components. Air spring plate 402 is generally rectangular shaped and rigidly connected to longitudinal cross braces 230A and 232A of base module 104. Similarly, air spring plate 404 is generally rectangular shaped and axially aligned with air spring plate 402. Air spring plate 404 is rigidly attached to longitudinal cross braces 230B and 232B of base module 108. Large air springs 424 and 426 are mounted to air spring plates 402 and 404. In a preferred embodiment, an example of a large air spring is the Firestone WO1-358-7403 capable of supporting 26,000 pounds.

Air spring plate 406 is generally square shaped and rigidly mounted in corner 407 (best shown in FIG. 4C) of base module 108. Air spring plate 412 is generally square shaped and rigidly mounted in corner 413 of base module 108. Air spring plate 408 is mounted in a corner of base module 104 and axially aligned with air spring plate 406. Air spring plate 410 is mounted in a corner of base module 104 and axially aligned with air spring plate 412. Small air spring 420 is mounted to air spring plates 406 and 408. Small air spring 422 is mounted to air spring plates 410 and 412. In a preferred embodiment, an example of a small air spring is the Firestone W21-760-7882 capable of supporting 2,500 pounds.

Lateral sway brace 430 is pivotally attached to bracket 432. Bracket 432 is rigidly connected to longitudinal cross brace 230A of base module 104. Lateral sway brace 430 is also pivotally attached to bracket 434. Bracket 434 is rigidly connected to longitudinal cross brace 230B of base module 108. Concealing panels 446 and 448 are connected to lower base sub assembly 101. Concealing panels 446 and 448 safeguard against inadvertent interference with the moving parts of the apparatus.

Shock absorber 428 is pivotally attached to bracket 436. Bracket 436 is rigidly connected to lateral cross brace 236B of base module 108. Shock absorber 428 is also pivotally attached to bracket 437. Bracket 437 is rigidly connected to lateral cross brace 236A of base module 104. Shock absorber 429 is pivotally attached to bracket 438. Bracket 438 is rigidly connected to lateral cross brace 236B of base module 108. Shock absorber 429 is also pivotally attached to bracket 439. Bracket 439 is rigidly connected to lateral cross brace 236A of base module 104.

Figure 4B:
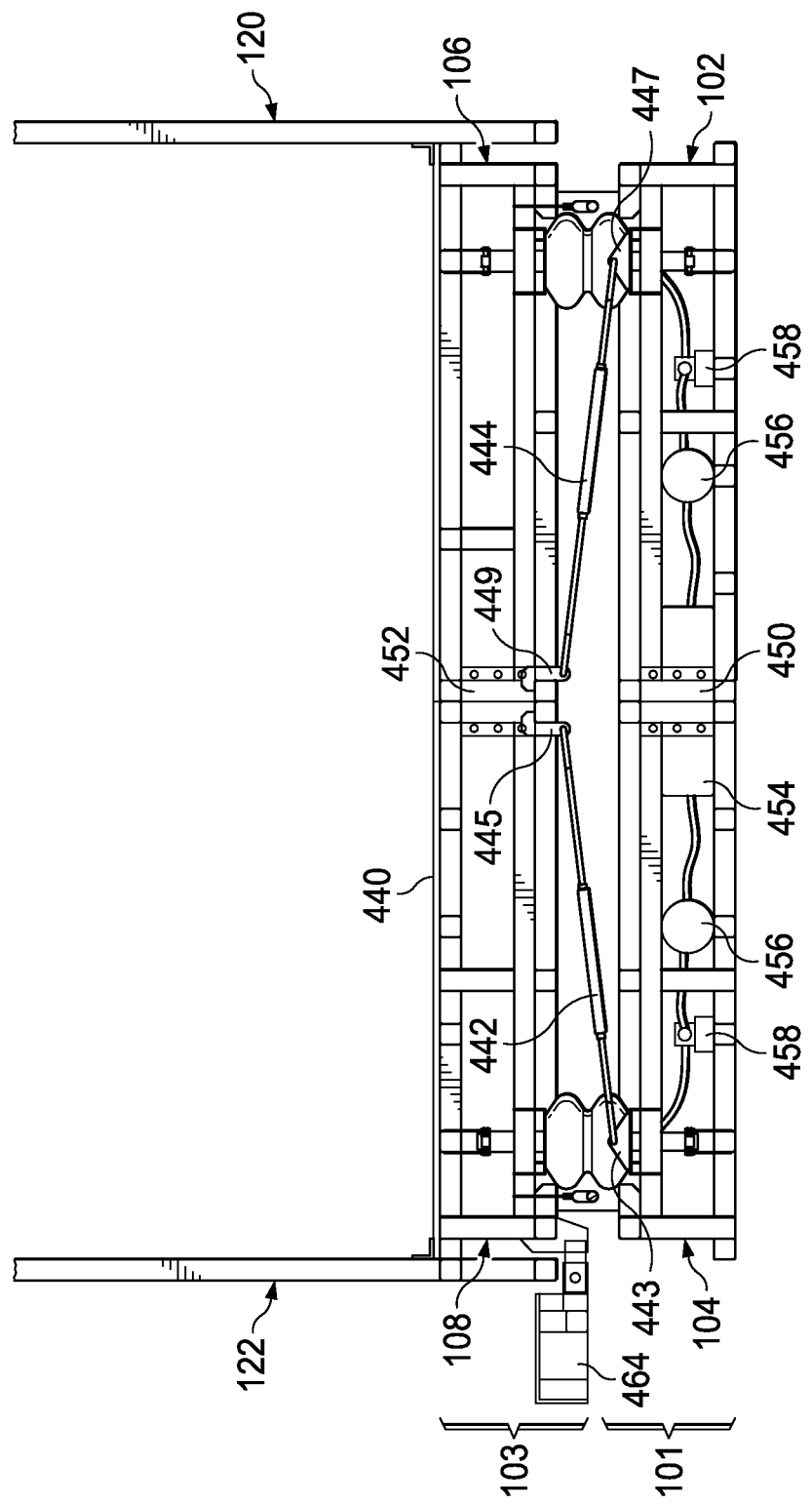
FIG. 4B is a partial section side view of an upper and lower base subassembly of a preferred embodiment.

The suspension components shown in FIG. 4A are provided to dynamically connect base module 104 to base module 108. Base module 104 and base module 108 are generally aligned. An identical set of suspension components to those shown in FIG. 4A is provided to connect base module 102 to base module 106. Base module 102 and base module 106 are generally aligned. The identical set of suspension components provided to connect base module 102 to base module 106 are depicted in FIGS. 4B and 4C.

Figure 4C:
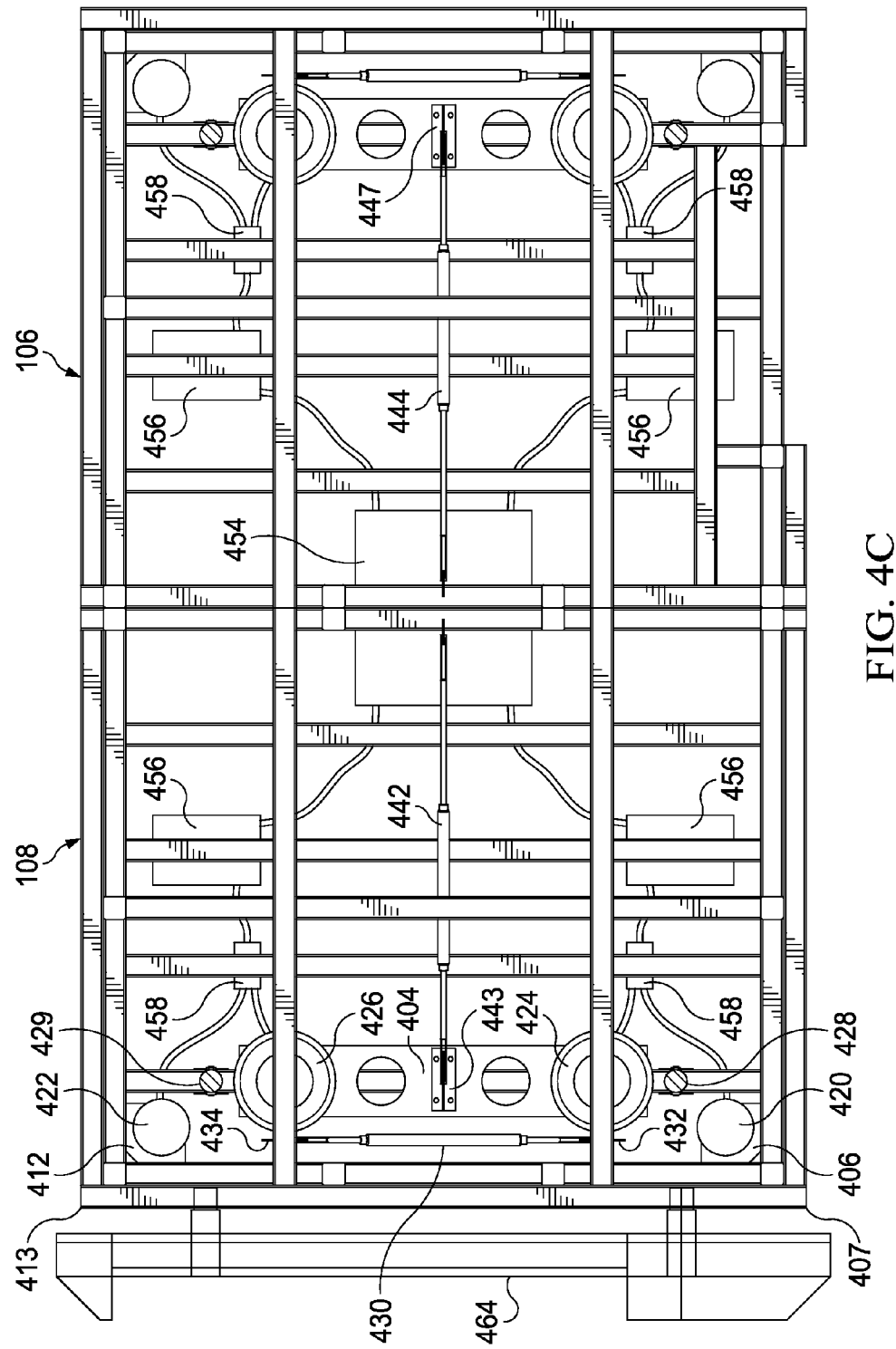
FIG. 4C is a partial section top view of an upper and lower base subassembly of a preferred embodiment.

Referring to FIGS. 4B and 4C, base module 102 is rigidly connected to base module 104 with connecting plate 450. Base module 106 is rigidly connected to base module 108 with connecting plate 452. Bumper 464 is mounted to base module 108. Each air spring of emergency medical services training apparatus 100 is connected to and driven by air compressor 454. Air compressor 454 is centrally positioned within lower base subassembly 101. In a preferred embodiment, an example of air compressor 454 is the Rolair FC2002. Air compressor 454 is connected to four air storage tanks 456. Each of the four storage tanks 456 is connected to a large air spring and a small air spring via four safety pressure switches 458.

Longitudinal sway brace 442 is pivotally attached to bracket 443. Bracket 443 is rigidly connected air spring plate 402 of base module 104. Longitudinal sway brace 442 is also pivotally attached to bracket 445. Bracket 445 is rigidly connected to base module 108. Longitudinal sway brace 444 is pivotally attached to bracket 447. Bracket 447 is rigidly connected the air spring plate of base module 102. Longitudinal sway brace 444 is also pivotally attached to bracket 449. Bracket 449 is rigidly connected to base module 106.

Floor 440 comprises three sections that have the same dimensions as the roof panels 130, 132, and 134. Floor 440 is adjacent upper base subassembly 103. Floor 440 is connected to layer 202A of base module 108 and layer 302 of base module 106. Floor 440 is further connected to wall panels 112, 114, 118, and 116; rear panel 122; and front panel 120.

Figure 5:
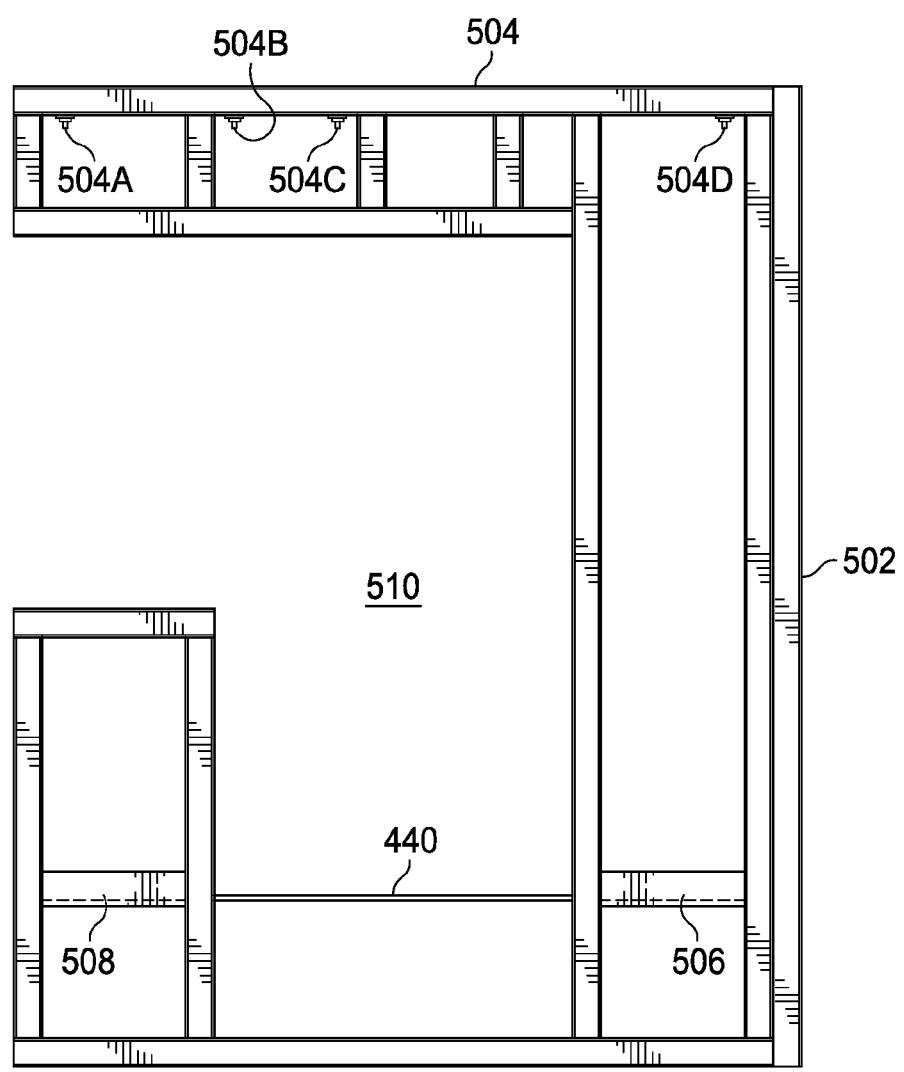
FIG. 5 is an elevation view of a wall panel of a preferred embodiment.

Referring to FIG. 5, wall panel 112 is shown. Wall panel 112 comprises a plurality of horizontal and vertical studs defining doorway 510. Vertical flange 502 is connected to one edge of wall panel 112. Vertical flange 502 is used to connect wall panel 112 to front panel 120. Horizontal flanges 506 and 508 are mounted horizontally across vertical studs. Horizontal flanges 506 and 508 are used to connect floor 440 to wall panel 112. In a preferred embodiment, vertical flange 502 and horizontal flanges 506 and 508 and all additional flanges described later are 2×2 inch "L" shaped angle iron. In a preferred embodiment, the flanges include mounting holes sized to accept typical ⅜ inch shear bolts and nuts. Other disposable bolts may be used. Mounting points 504A, 504B, 504C, and 504D are positioned across horizontal stud 504 of wall panel 112. Mounting points 504A, 504B, 504C, and 504D are used to mount roof assembly 124 to wall panel 112.

Figure 6:
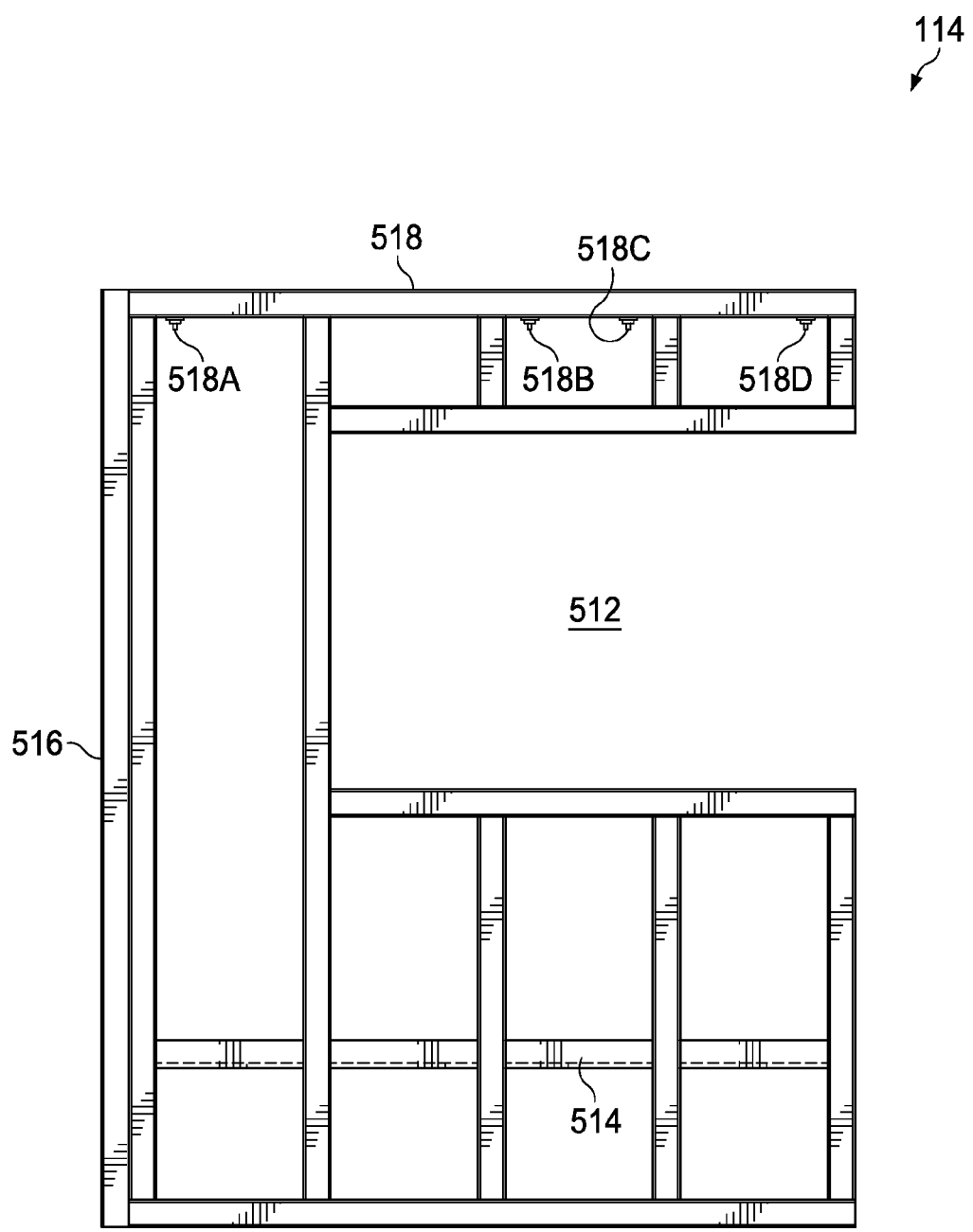
FIG. 6 is an elevation view of a wall panel of a preferred embodiment.

Referring to FIG. 6, wall panel 114 is shown. Wall panel 114 comprises a plurality of horizontal and vertical studs defining window 512. Vertical flange 516 is connected to one edge of wall panel 114. Vertical flange 516 is used to connect wall panel 114 to rear panel 122. Horizontal flange 514 is mounted horizontally across vertical studs. Horizontal flange 514 is used to connect floor 440 to wall panel 114. Mounting points 518A, 518B, 518C, and 518D are positioned across horizontal stud 518 of wall panel 114. Mounting points 5184, 518B, 518C, and 518D are used to mount roof assembly 124 to wall panel 114.

Figure 7:
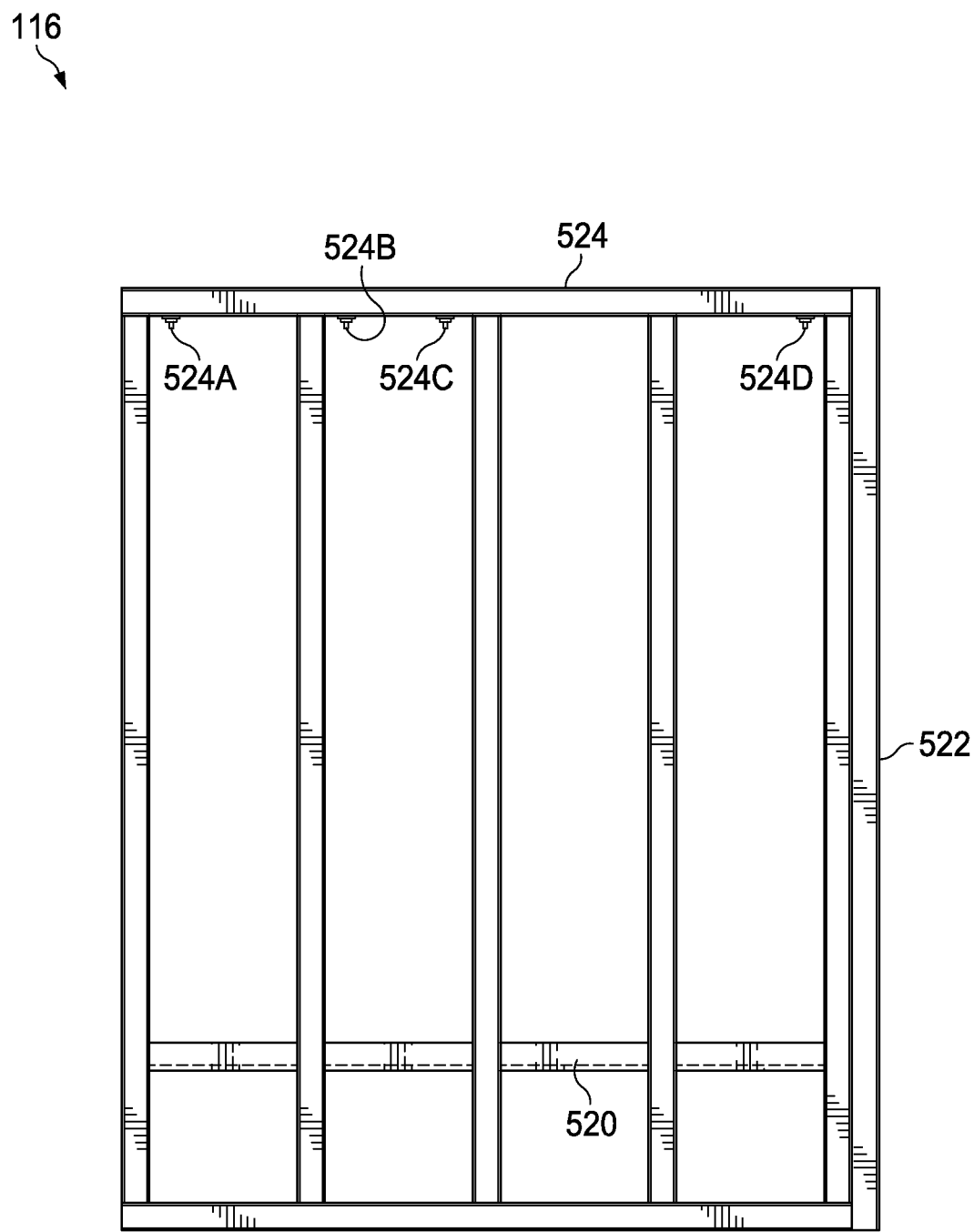
FIG. 7 is an elevation view of a wall panel of a preferred embodiment.

Referring to FIG. 7, wall panel 116 is shown. Wall panel 116 comprises a plurality of horizontal and vertical studs forming an overall rectangular shape. Vertical flange 522 is connected to one edge of wall panel 116. Vertical flange 522 is used to connect wall panel 116 to front panel 120. Horizontal flange 520 is mounted horizontally across a plurality of vertical studs. Horizontal flange 520 is used to connect floor 440 to wall panel 116. Mounting points 524A, 524B, 524C, and 524D are positioned across the horizontal stud 524 of wall panel 116. Mounting points 5244, 524B, 524C, and 524D are used to mount roof assembly 124 to wall panel 116.

Figure 8:
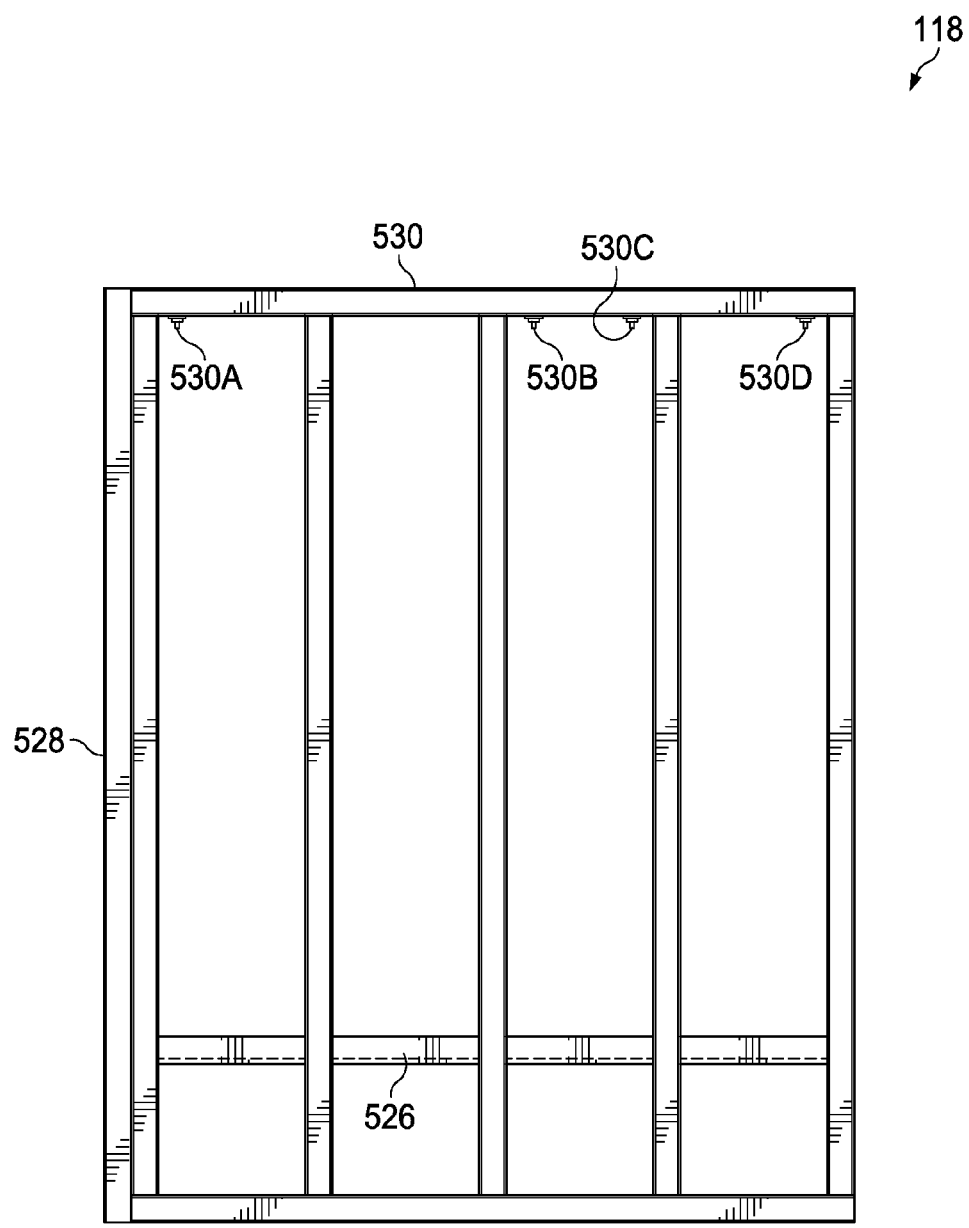
FIG. 8 is an elevation view of a wall panel of a preferred embodiment.

Referring to FIG. 8, wall panel 118 is shown. Wall panel 118 comprises a plurality of horizontal and vertical studs forming a generally rectangular shape. Vertical flange 528 is connected to one edge of wall panel 118. Vertical flange 528 is used to connect wall panel 118 to rear panel 122. Horizontal flange 526 is mounted horizontally across multiple vertical studs. Horizontal flange 526 is used to connect floor 440 to wall panel 118. Mounting points 530A, 530B, 530C, and 530D are positioned across horizontal stud 530 of wall panel 118. Mounting points 530A, 530B, 530C, and 530D are used to mount roof assembly 124 to wall panel 118.

Figure 9:
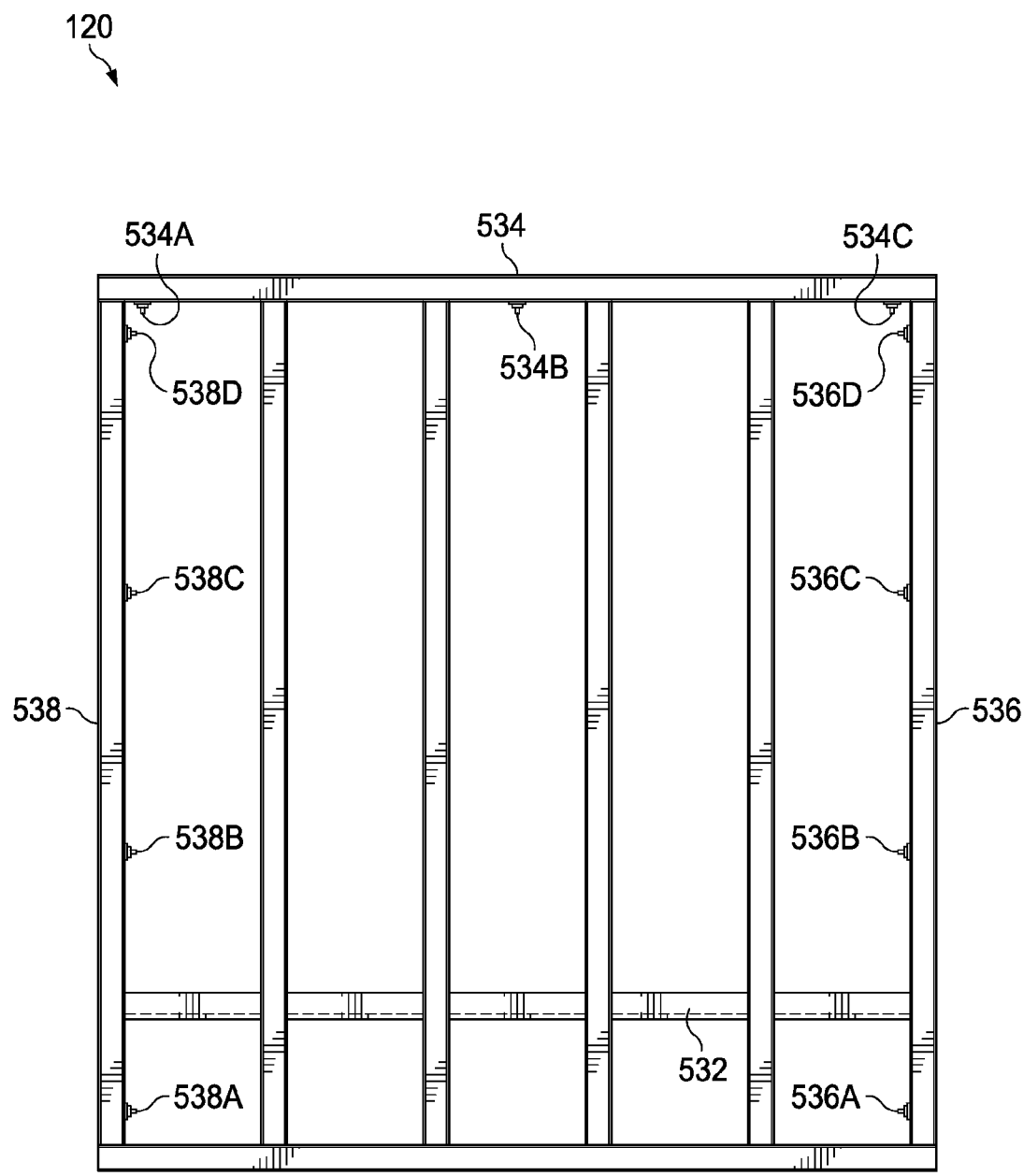
FIG. 9 is an elevation view of a front panel of a preferred embodiment.

Referring to FIG. 9, front panel 120 is shown. Front panel 120 comprises a plurality of horizontal and vertical studs forming a generally rectangular shape. Horizontal flange 532 is mounted horizontally across multiple vertical studs. Horizontal flange 532 is used to connect floor 440 to front panel 120. Mounting points 534A, 534B, and 534C are positioned across horizontal stud 534 of front panel 120. Mounting points 534A, 534B, and 534C are used to mount roof assembly 124 to front panel 120. Mounting points 536A, 536B, 536C, and 536D are positioned along vertical stud 536 of front panel 120. Mounting points 536A, 536B, 536C, and 536D are used to connect front panel 120 to wall panel 112 and are sized to engage the mounting holes in flange 502. Mounting points 538A, 538B, 538C, and 538D are positioned along vertical stud 538 of front panel 120. Mounting points 538A, 538B, 538C, and 538D are used to connect front panel 120 to wall panel 116 and are sized to engage the mounting holes in flange 522.

Figure 10:
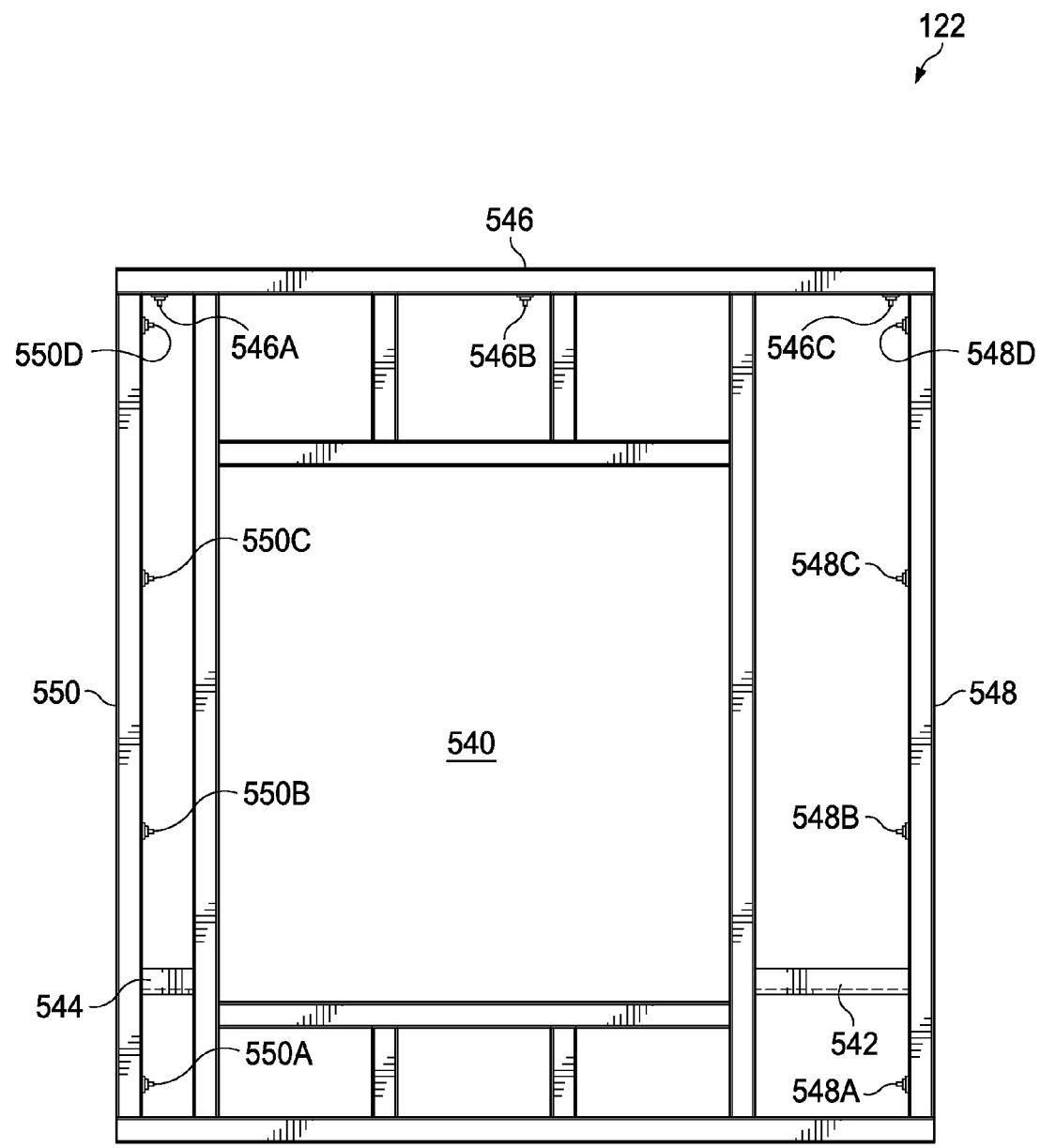
FIG. 10 is an elevation view of a rear panel of a preferred embodiment.

Referring to FIG. 10, rear panel 122 is shown. Rear panel 122 comprises a plurality of horizontal and vertical studs forming a generally rectangular shape and defining double doorway 540. Horizontal flanges 542 and 544 are mounted horizontally across vertical studs. Horizontal flanges 542 and 544 are used to connect floor 440 to rear panel 122. Mounting points 546A, 546B, and 546C are positioned across horizontal stud 546. Mounting points 546A, 546B, and 546 are used to mount roof assembly 124 to rear panel 122. Mounting points 548A, 548B, 548C, and 548D are positioned along vertical stud 548 of rear panel 122. Mounting points 548A, 548B, 548C, and 548D are used to connect rear panel 122 to wall panel 114 and are sized to engage the mounting holes in flange 516. Mounting points 550A, 550B, 550C, and 550D are positioned along vertical stud 550 of rear panel 122. Mounting points 550A, 550B, 550C, and 550D are used to connect rear panel 122 to wall panel 118 and are sized to engage the mounting holes in flange 528.

Figure 11:
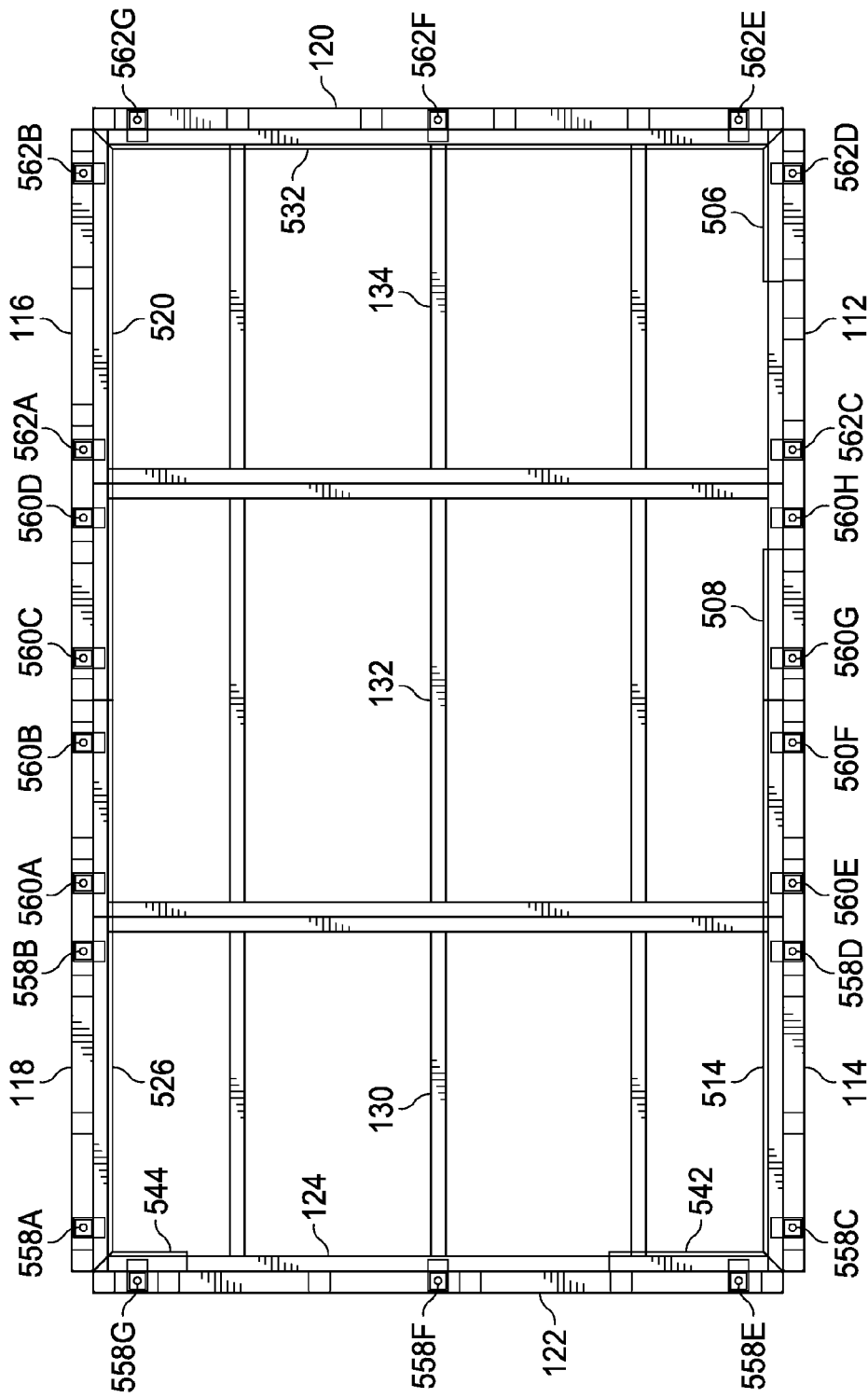
FIG. 11 is a top view of a roof panel of a preferred embodiment.

Referring to FIG. 11, roof assembly 124 is shown connected to the wall panels, the front panel, and the rear panel. Roof assembly 124 comprises roof panels 130, 132, and 134. Each roof panel comprises a framework of intersecting studs. Roof panel 130 includes mounting brackets 558A-558G spaced around its perimeter. Roof panel 132 includes mounting brackets 560A-560H. Roof panel 134 includes mounting brackets 562A-562G positioned around its perimeter. Each mounting bracket 558A-558G, 560A-560H, and 562A-562G includes a mounting hole sized to engage the mounting points on the wall panels, the front panel, and the rear panel. Specifically, the mounting brackets engage the mounting points according to the following table.

| Mounting bracket | Mounting Point |
| --- | --- |
| 558A | 530A |
| 558B | 530B |
| 558C | 518A |
| 558D | 518B |
| 558E | 546C |
| 558F | 546B |
| 558G | 546A |
| 560A | 530C |
| 560B | 530D |
| 560C | 524A |
| 560D | 524B |
| 560E | 518C |
| 560F | 518D |
| 560G | 504A |
| 560H | 504B |
| 562A | 524C |
| 562B | 524D |
| 562C | 504C |
| 562D | 504D |
| 562E | 534C |
| 562F | 534B |
| 562G | 534A |

Figure 12:
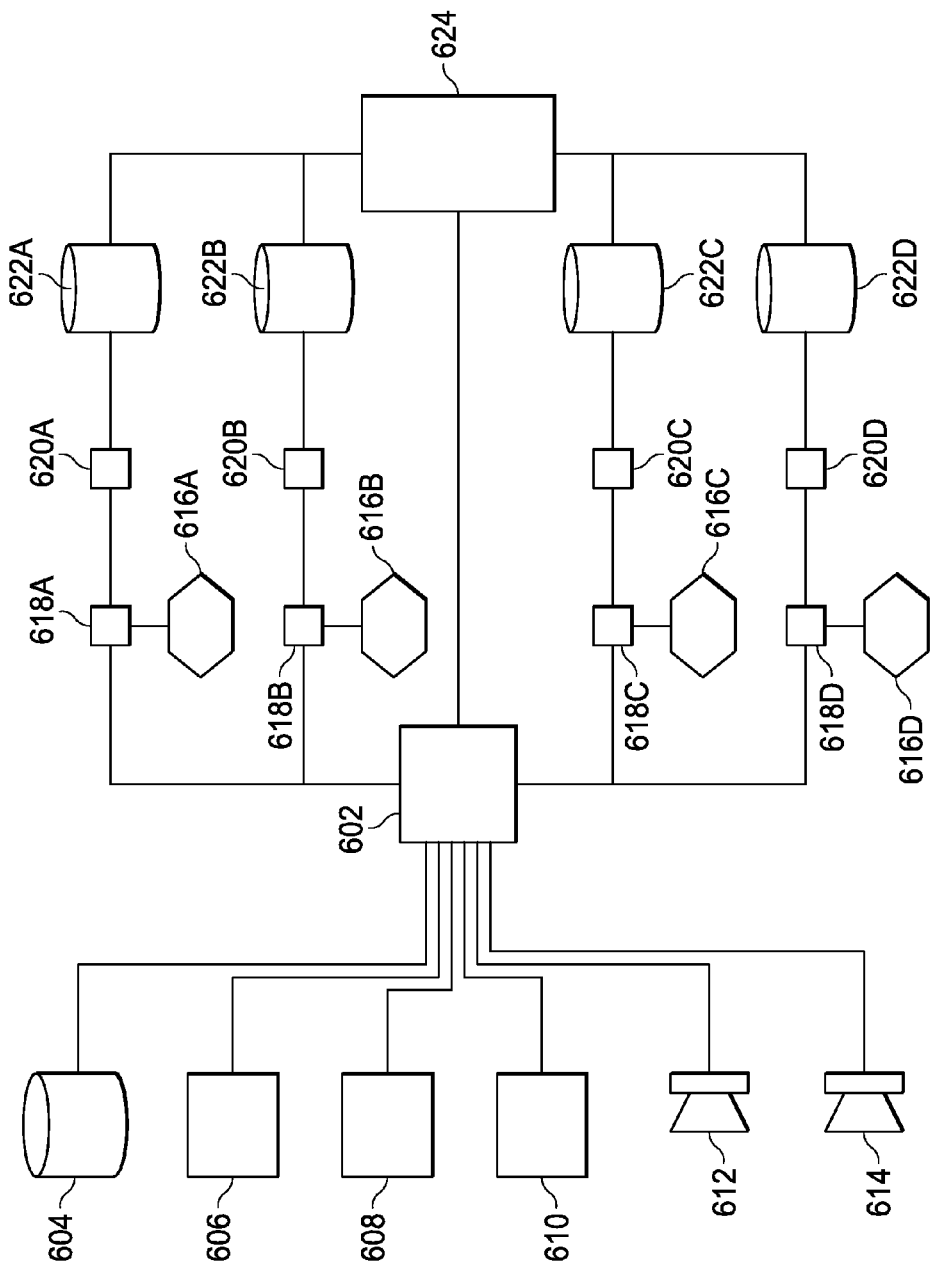
FIG. 12 is a schematic diagram of a preferred embodiment of a suspension system.

Referring to FIG. 12, a schematic diagram of the suspension system 600 is shown. Server 602 of the computer system has memory 604. Manual control device 606 is connected to server 602. In a preferred embodiment, manual control device 606 is a joystick controller. In alternate embodiments, manual control device 606 may be a number pad, a keyboard, or a cursor control device, such as a mouse, or a touch screen display, remote control or any other device operative to interact with the computer system. Video monitors 608 and 610 are connected to server 602. Speakers 612 and 614 are connected to server 602.

Server 602 is connected to solenoid valves 618A-D to actuate the air springs. Solenoid valves 618A-D control the inflation and deflation of air springs 616A-D, respectively. Solenoid valves 618A-D control the entry and exit of compressed air to and from air springs 616A-D. Compressor 624 is attached to air storage tanks 622A-D. Server 602 is connected to compressor 624 to monitor the activity of compressor 624. Air storage tank 622A is connected to solenoid 618A via pressure sensor 620A. Air storage tank 622B is connected to solenoid 618B via pressure sensor 620B. Air storage tank 622C is connected to solenoid 618C via pressure sensor 620C. Air storage tank 622D is connected to solenoid 618D via pressure sensor 620D.

Server 602 can include a set of instructions that can be executed to cause server 602 to perform any one or more of the methods or computer based functions disclosed herein. Server 602 may operate as a standalone device or may be connected, via a network, to other computer systems or peripheral devices. The computer system can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, or any other machine capable of executing a set of instructions.

Server 602 may include a processor, a memory, and a display unit. The processor may be a component in a variety of systems. The processor may be one or more general processors, digital signal processors, application specific integrated circuits, field programmable gate arrays, servers, networks, digital circuits, analog circuits, combinations thereof, or other now known or later developed devices for analyzing and processing data. The processor may implement a software program, such as code generated manually. The memory may be a main memory, a static memory, or a dynamic memory. The memory may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory may be an external storage device or database for storing data. Examples include a hard drive, compact disc ("CD"), digital video disc ("DVD"), memory card, memory stick, floppy disc, universal serial bus ("USB") memory device, or any other device operative to store data. The memory is operable to store instructions executable by the processor. The display unit may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory.

In use, each structural component of emergency medical services training apparatus 100, the base modules, the wall panels, the front panel, the rear panel, and the roof panels, is constructed off-site and transported to an assembly location. Because no length or width of any structural component of emergency medical services training apparatus 100 is over approximately seven feet and no depth measurement of any structural component of emergency medical services training apparatus 100 is over approximately one foot, all structural components can be easily moved through typical doorways, elevators, and hallways without the need to remove doors or knock down walls to get the structural components to the classroom for assembly.

Emergency medical services training apparatus 100 is assembled, on site, at the desired location for training. Once assembled, a trainer can simulate the movement of an ambulance en route. Upper base subassembly 103 is moved relative to lower base subassembly 101 through actuation of the air springs. The trainer uses the joysticks to move upper base subassembly 103 and the attached enclosure subassembly 105 in a random sequence to simulate the movement of the ambulance during road travel. As the trainer manipulates the joysticks, movement instructions are created and sent from the joysticks, or any other manual control device, to the computer where the computer translates the movement instructions from the joysticks and transmits air spring instructions to the solenoid valves to inflate or deflate the air springs. As the air springs inflate and deflate, the upper base subassembly and the attached enclosure subassembly move relative to the lower base subassembly simulating the movements of an ambulance as if the ambulance were transporting a patient. The sway braces help control and reduce longitudinal and lateral torsional loads. The shock absorbers smooth out and damp sudden vertical bumps and dips. The sway bars and the shock absorbers operate just as they would in a typical road travelling vehicle. As a result, emergency medical personnel in training can thus experience the dangers of providing emergency medical services in an unpredictable mobile situation in order to better prepare them for real life situations under actual circumstances.

In an alternate embodiment, the computer can be programmed to execute a set of instructions, without input from the manual control device, which actuate the air springs to induce motion that simulates common ambulance movements. Examples of common ambulance movements include but are not limited to high speed driving, acceleration, sudden deceleration, parking, and specific routes to and from a hospital. A set of programmed instructions may also include, in addition to the actuation of the air springs, playing audio and video through the speakers and display screens within the enclosure subassembly to simulate voice instructions from other emergency personnel or the ambulance driver.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. An emergency medical services training apparatus comprising:
   a lower subassembly comprising a first base module horizontally connected to a second base module;
   an upper subassembly comprising a third base module horizontally connected to a fourth base module and aligned with the lower subassembly;
   the first base module vertically aligned with the third base module;
   the second base module vertically aligned with the fourth base module;
   a first set of controllable suspension parts connected to the first base module and the third base module;
   a second set of controllable suspension parts connected to the second base module and the fourth base module;
   an enclosure subassembly connected to the upper subassembly;
   a computer system connected to the first set of controllable suspension parts and the second set of controllable suspension parts; and,
   wherein a set of instructions from the computer system actuates the first set of controllable suspension parts and the second set of controllable suspension parts and alters a position of the upper subassembly relative to the lower subassembly to simulate ambulance movements during road travel.

2. The emergency medical services training apparatus of claim 1 wherein:
the first base module is aligned with the third base module and the second base module is aligned with the fourth base module.

3. The emergency medical services training apparatus of claim 1 wherein the enclosure subassembly further comprises:
a first wall panel connected to a second wall panel;
a rear panel connected to the second wall panel;
a third wall panel connected to the rear panel;
a fourth wall panel connected to the third wall panel;
a front panel connected to the fourth wall panel and the first wall panel; and,
a roof assembly connected to the first wall panel, the second wall panel, the third wall panel, the fourth wall panel, the rear panel, and the front panel.

4. The emergency medical services training apparatus of claim 3 wherein:
the roof assembly comprises a first roof panel, a second roof panel, and a third roof panel;
the first roof panel connected to the second wall panel, the rear panel and the third wall panel;
the second roof panel connected to the first wall panel, the second wall panel, the third wall panel, and the fourth wall panel; and,
the third roof panel connected to the first wall panel, the fourth wall panel, and the front panel.

5. The emergency medical services training apparatus of claim 1 further comprising:
a first wall panel connected to a second wall panel;
a rear panel connected to the second wall panel;
a third wall panel connected to the rear panel;
a fourth wall panel connected to the third wall panel;
a front panel connected to the fourth wall panel and the first wall panel; and,
a roof assembly comprising a first roof panel, a second roof panel, and a third roof panel wherein the roof assembly is connected to the first wall panel, the second wall panel, the third wall panel, the fourth wall panel, the rear panel, and the front panel; and,
wherein the first base module, the second base module, the third base module, the fourth base module, the first wall panel, the second wall panel, the third wall panel, the fourth wall panel, the rear panel, the front panel, the first roof panel, the second roof panel, and the third roof panel have a length no greater than seven feet, a width no greater than seven feet, and a depth no greater than one foot.

6. The emergency medical services training apparatus of claim 5 further comprising:
a floor connected to the third base module, the fourth base module, the first wall panel, the second wall panel, the third wall panel, the fourth wall panel, the rear panel, and the front panel; and,
a bumper connected to the fourth base module.

7. The emergency medical services training apparatus of claim 1 further comprising:
a manual control device connected to the computer system and operable to transmit movement instructions to the computer system.

8. The emergency medical services training apparatus of claim 1 wherein the first set of controllable suspension parts and the second set of controllable suspension parts further comprise:
a set of air springs connected to an air compressor;
a manual control device connected to the computer system and the computer system connected to the set of air springs; and,
wherein the manual control device is operable to transmit movement instructions to the computer system and the computer system is operable to translate the movement instructions to the set of air springs.

9. The emergency medical services training apparatus of claim 1 further comprising:
a longitudinal sway brace connected to the lower subassembly and the upper subassembly; and
a lateral sway brace connected to the lower subassembly and the upper subassembly.

10. The emergency medical services training apparatus of claim 1 further comprising:
a set of shock absorbers connected to the lower subassembly and the upper subassembly.

11. The emergency medical services training apparatus of claim 1 further comprising:
a floor connected to the upper subassembly and the enclosure subassembly; and,
a bumper connected to the upper subassembly.

12. A system for training emergency medical services personnel in a simulated mobile environment comprising:
a lower subassembly comprised of a first base module horizontally connected to a second base module;
an upper subassembly comprised of a third base module horizontally connected to a fourth base module;
the first base module vertically aligned with the third base module;
the second base module vertically aligned with the fourth base module;
a set of air springs connected between the first base module and the third base module and connected between the second base module and the fourth base module;
a plurality of interconnected wall panels attached to the upper subassembly;
a roof assembly attached to the plurality of interconnected wall panels; and,
a computer system, connected to the set of air springs, operable to transmit a set of movement instructions to the set of air springs such that the set of air springs are actuated and the position of the upper subassembly relative to the lower subassembly is altered.

13. The system for training emergency medical services personnel in a simulated mobile environment of claim 12 wherein:
the first base module is aligned with the third base module and the second base module is aligned with the fourth base module.

14. The system for training emergency medical services personnel in a simulated mobile environment of claim 12 further comprising:
a first longitudinal sway brace connected to the first base module and the third base module;
a second longitudinal sway brace connected to the second base module and the fourth base module;
a first lateral sway brace connected to the first base module and the third base module; and,
a second lateral sway brace connected to the second base module and the fourth base module.

15. The system for training emergency medical services personnel in a simulated mobile environment of claim 12 further comprising:
   a first plurality of shock absorbers connected to both the first base module and the third base module; and,
   a second plurality of shock absorbers connected to both the second base module and the fourth base module.

16. The system for training emergency medical services personnel in a simulated mobile environment of claim 12 wherein the plurality of interconnected wall panels further comprises:
   a first wall panel connected to a second wall panel;
   a rear panel connected to the second wall panel;
   a third wall panel connected to the rear panel;
   a fourth wall panel connected to the third wall panel;
   a front panel connected to the fourth wall panel and the first wall panel; and,
   the roof assembly connected to the first wall panel, the second wall panel, the third wall panel, the fourth wall panel, the rear panel, and the front panel.

17. The system for training emergency medical services personnel in a simulated mobile environment of claim 12 further comprising:
   a first wall panel connected to a second wall panel;
   a rear panel connected to the second wall panel;
   a third wall panel connected to the rear panel;
   a fourth wall panel connected to the third wall panel;
   a front panel connected to the fourth wall panel and the first wall panel; and,
   a roof assembly comprising a first roof panel, a second roof panel, and a third roof panel wherein the roof assembly is connected to the first wall panel, the second wall panel, the third wall panel, the fourth wall panel, the rear panel, and the front panel; and,
   wherein the first base module, the second base module, the third base module, the fourth base module, the first wall panel, the second wall panel, the third wall panel, the fourth wall panel, the rear panel, the front panel, the first roof panel, the second roof panel, and the third roof panel each have a set of dimensions to allow passage through a commercial door.

18. The system for training emergency medical services personnel in a simulated mobile environment of claim 17 where the commercial door is seven feet by three feet in size.

19. The system for training emergency medical services personnel in a simulated mobile environment of claim 17 wherein the set of dimensions is no greater than seven feet by seven feet by one foot.

20. The system for training emergency medical services personnel in a simulated mobile environment of claim 12 further comprising:
   a horizontal flange connected to each of the plurality of interconnected wall panels;
   a floor connected to the upper subassembly and to each flange of the plurality of interconnected wall panels.

21. An emergency medical personnel training apparatus simulating a moving ambulance comprising:
   a first base module horizontally connected to a second base module;
   a third base module horizontally connected to a fourth base module where the first base module is vertically aligned with the third base module and the second base module is vertically aligned with the fourth base module;
   a first wall panel connected to the third base module;
   a second wall panel connected to the first wall panel and the fourth base module;
   a rear panel connected to the second wall panel and the fourth base module;
   a third wall panel connected to the rear panel and the fourth base module;
   a fourth wall panel connected to the third wall panel and the third base module;
   a front panel connected to the fourth wall panel, the first wall panel, and the third base module;
   a first roof panel connected to the second wall panel, the rear panel, and the third wall panel;
   a second roof panel connected to the first wall panel, the second wall panel, the third wall panel, and the fourth wall panel;
   a third roof panel connected to the first wall panel, the front panel, and the fourth wall panel;
   a floor connected to the third base module, the fourth base module, the first wall panel, the second wall panel, the third wall panel, the fourth wall panel, the rear panel, and the front panel;
   a plurality of air springs connecting the first base module to the third base module and connecting the second base module to the fourth base module;
   a controller connected to the plurality of air springs operable to transmit a set of movement instructions to the plurality of air springs such that the air springs reposition the third base module and the fourth base module relative to the first base module and the second base module; and,
   wherein the first base module, the second base module, the third base module, the fourth base module, the first wall panel, the second wall panel, the third wall panel, the fourth wall panel, the rear panel, the front panel, the first roof panel, the second roof panel, and the third roof panel each have a length less than approximately seven feet, each have a width less than approximately seven feet, and each have a depth less than approximately one foot.

22. The emergency medical personnel training apparatus simulating a moving ambulance of claim 21 further comprising a manual control device connected to the controller operable to create the set of movement instructions and transmit the set of movement instructions to the controller.

23. An emergency medical personnel training apparatus simulating a moving ambulance comprising:
   a first base module horizontally aligned with and connected to a second base module;
   a third base module horizontally aligned with and connected to a fourth base module;
   the first base module vertically aligned with the third base module;
   the second base module vertically aligned with the fourth base module;
   a first wall panel connected to the third base module;
   a second wall panel connected to the first wall panel and the fourth base module;
   a rear panel connected to the second wall panel and the fourth base module;
   a third wall panel connected to the rear panel and the fourth base module;
   a fourth wall panel connected to the third wall panel and the third base module;
   a front panel connected to the fourth wall panel, the first wall panel, and the third base module;
   a first roof panel connected to the second wall panel, the rear panel, and the third wall panel;

a second roof panel connected to the first wall panel, the second wall panel, the third wall panel, and the fourth wall panel;

a third roof panel connected to the first wall panel, the front panel, and the fourth wall panel;

a first air spring plate connected to the first base module;

a second air spring plate connected to the second base module;

a third air spring plate connected to the third base module;

a fourth air spring plate connected to the fourth base module;

a first air spring mounted to a first end of the first air plate and a first end of the third air plate;

a second air spring mounted to a second end of the first air plate and a second end of the third air plate;

a third air spring mounted to a first end of the second air plate and a first end of the fourth air plate;

a fourth air spring mounted to a second end of the second air plate and a second end of the fourth air plate;

a first shock absorber mounted to the first base module and the third base module proximate the first air spring;

a second shock absorber mounted to the first base module and the third base module proximate the second air spring;

a third shock absorber mounted to the second base module and the fourth base module proximate the third air spring;

a fourth shock absorber mounted to the second base module and the fourth base module proximate the fourth air spring;

a first longitudinal sway brace connected to the first base module and the third base module;

a second longitudinal sway brace connected to the second base module and the fourth base module;

a first lateral sway brace connected to the first base module and the third base module; and, a second lateral sway brace connected to the second base module and the fourth base module;

a controller connected to the first air spring, the second air spring, the third air spring and the fourth air spring;

the controller operable to transmit a set of movement instructions to the first air spring, the second air spring, the third air spring and the fourth air spring such that the third base module and the fourth base module are repositioned relative to the first base module and the second base module; and, a manual control device connected to the controller operable to create the set of movement instructions and transmit the set of movement instructions to the controller.

\* \* \* \* \*

UNITED STATES PATENT AND TRADEMARK OFFICE
CERTIFICATE OF CORRECTION

Page 1 of 1

PATENT NO. : 9,836,988 B2
APPLICATION NO. : 14/735852
DATED : December 5, 2017
INVENTOR(S) : Robert R. Harrison It is certified that error appears in the above-identified patent and that said Letters Patent is hereby corrected as shown below:

In the Specification

Column 7; Line 31: Change "5244" to -- 524A --

Signed and Sealed this
Seventeenth Day of March, 2020

Andrei Iancu
*Director of the United States Patent and Trademark Office*